United States Patent [19]

Fiocco et al.

[11] Patent Number: 4,511,537
[45] Date of Patent: Apr. 16, 1985

[54] EXTRACTION ZONE

[75] Inventors: Robert J. Fiocco, Summit; James D. Bushnell, Berkeley Heights, both of N.J.

[73] Assignee: Exxon Research and Engineering Co., Florham Park, N.J.

[21] Appl. No.: 450,350

[22] Filed: Dec. 16, 1982

[51] Int. Cl.³ .............................................. B01D 11/04
[52] U.S. Cl. ................................. 422/256; 196/14.52; 202/158; 210/511; 261/114 R
[58] Field of Search ............ 261/113, 114 R, 114 TC, 261/114 JP; 210/511; 196/14.52; 202/158; 422/255, 256

[56] References Cited

U.S. PATENT DOCUMENTS

| | | | |
|---|---|---|---|
| 2,520,391 | 8/1950 | Findlay | 261/114 R |
| 2,614,031 | 10/1952 | Tickler | 422/256 |
| 2,669,505 | 2/1954 | Rhys, Jr. et al. | 422/256 |
| 2,721,790 | 10/1955 | Olney | 196/14.52 |
| 2,759,872 | 8/1956 | Claridge et al. | 196/14.52 |
| 2,767,966 | 10/1956 | Chave | 261/113 |
| 2,768,071 | 10/1956 | Pokorny et al. | 422/256 |
| 2,791,537 | 5/1957 | Felix et al. | 196/14.52 |
| 2,851,396 | 9/1958 | Myers, Jr. | 196/14.52 |
| 2,861,027 | 11/1958 | Farmer | 196/14.52 |
| 2,900,238 | 8/1959 | Jones | 422/256 |
| 3,053,520 | 9/1962 | Streuber | 261/114 R |
| 3,899,299 | 8/1975 | Bushnell et al. | 261/114 R X |

FOREIGN PATENT DOCUMENTS

| | | | |
|---|---|---|---|
| 512346 | 4/1955 | Canada | 422/256 |
| 20094 | 12/1980 | European Pat. Off. | 422/256 |

*Primary Examiner*—Richard L. Chiesa
*Attorney, Agent, or Firm*—Edward H. Mazer; Robert J. North

[57] ABSTRACT

An improved cascade weir type extraction zone is described in which at least one of the weir means is disposed above the associated tray. This improved extraction zone is of particular utility in lube oil processing operations.

23 Claims, 4 Drawing Figures

EXTRACTION ZONE

BACKGROUND OF THE INVENTION

This invention is directed at an improved extraction zone for liquid-liquid contacting. More specifically, this invention is directed at an improved extraction zone having particular applicability to the removal of soluble contaminants from a feedstream.

Solvent extraction is well-known and has been used for many years for product separation. In the petroleum industry solvent extraction has been widely used for the removal of impurities from process streams, such as the removal of aromatic compounds from lube oil feedstocks. In liquid-liquid extraction one or more components in the liquid mixture are removed by intimate contact with another liquid which is selectively miscible either with the impurities or with the desired product. Liquid-liquid extractions may be carried out in a number of different ways, such as by batch, co-current or countercurrent extraction. Countercurrent extraction frequently is a preferred method for effecting the extraction, since it is continuous and since fresh solvent typically contacts the product just before the product exits from the extraction zone. Usually the solvent utilized is selectively miscible with the impurity to be removed but not miscible, or only slightly miscible, with the product. Countercurrent solvent extraction techniques are widely used in the petroleum industry for effecting product purification. In the manufacture of lube oils, the lube oil feedstock frequently is passed through a countercurrent extraction zone to remove product impurities, such as undesired aromatic components. Solvents frequently employed for extracting the aromatic components from the lube oil feedstock include phenol and N-methyl pyrrolidone (NMP).

When it is necessary to increase the throughput of a lube extraction unit, for example because of increased product demand or because lower yields from a poorer crude require a higher feed rate, the solvent recovery sections of the plant often can be expanded by conventional means such as more heat exchange, additional flash drums, larger pumps, or larger capacity control valves. The ability of the internals in the solvent contacting tower to handle the increased load then may become the limiting portion of the plant. Therefore, it would be desirable to provide internals for the countercurrent contacting which have higher capacity per unit of tower cross-sectional area than internals currently in use while retaining hydraulic stability and effective contacting for mass transfer. The design of such trays is complicated by the fact that several feedstocks of different density, viscosity and yield are often processed in the same extraction zone at different feed rates, temperatures and solvent treats. Moreover, for a given feedstock the flow rates vary considerably within the extraction zone from tray to tray, thus requiring a great deal of hydraulic fexibility for the trays. Furthermore, these systems are usually characterized by very low interfacial tension, so that while mixing and mass transfer are easy, subsequent separation of the phases by settling and coalescence is difficult. Thus, a problem encountered in the design of the extraction zones is minimizing excess mixing to thereby avoid emulsion formation and excess recirculation and turbulence.

Previously, efforts have been made to improve the extractive process primarily by improving extraction tower internals. U.S. Pat. No. 3,899,299 discloses a countercurrent extraction zone in which the less dense feedstock enters at the bottom of the extraction zone, while the more dense solvent enters at the top. A series of horizontally disposed, vertically spaced-apart trays are located in the zone. The less dense feed rising through the column flows under the tray, over a damlike device and passes into cascade weir means located at substantially the same elevation as the tray. Perforations in the perforate plate of the weir means cause the feed to be broken into small droplets, which pass upwardly to the area beneath the next higher tray, where the droplets coalesce. This process of droplet formation and coalescence is repeated at each tray in the extraction zone. Simultaneously, solvent passes downwardly flowing generally across the top of each tray removing impurities from the droplets of feed rising through the solvent. It has been found that this design was not completely satisfactory, at relatively high feed rates per unit of tower cross-sectional area because the buildup of oil under each tray, particularly the bottom tray, resulted in a loss of lube oil entrained in the bottom extract stream, which limited extraction zone capacity.

U.S. Pat. No. 2,759,872 is directed at a liquid-liquid extraction zone in which each tray includes a rectangular riser having a series of partitions disposed beneath downcomers. The laminar flow from the rectangular risers is dispersed into droplets in the downwardly flowing heavy phase. This design is not desirable because the parallel baffles, which form the riser and discharge channels, must be very close together to achieve low velocity laminar flow by frictional resistance. These small channels are susceptible to plugging with dirt, scale and corrosion by-products. In addition, the velocity through the discharge baffles, which is necessary to provide the desired frictional resistance, may induce entrainment of the heavy phase in the lighter phase. Moreover, since restrictive orifices are not used to reduce pressure drop, the riser height above the tray must be relatively great for an effective hydraulic seal without excessive recirculation of the heavy phase.

U.S. Pat. No. 2,791,537 discloses a liquid-liquid contacting device in which both oil and solvent pass cocurrently through the V-notches of an underflow weir, thence up to a mixing zone provided with packing material. However, it has been found that the use of V-notches may result in unstable oil flow. Also, the passage of all the solvent and oil through packing material leads to gradual fouling of the packing with scale, corrosion byproducts, etc., leading to periodic shutdown of the equipment to clean the packing.

U.S. Pat. No. 2,861,027 discloses an extraction zone in which solvent and feed flow across the tower in a countercurrent extraction process. This patent is directed at reducing hydraulic instability, but does not disclose a cascade weir means as the device to accomplish reduced instability. Rather than reducing excess mixing energy in minimize emulsion formation, this design actually may encourage excessive mixing by providing two dispersion devices on each tray. This design is not well suited for low interfacial tension systems, such as lube oil and N-methyl pyrrolidone systems, where excess mixing hinders the separation.

U.S. Pat. No. 2,721,790 discloses a liquid-liquid contacting device utilizing perforate partitions and a coalescence means across the entire diameter of the extraction zone. This patent has the disadvantage inherent in a simple perforate plate of little flexibility in flow rate.

Moreover this patent does not disclose a cascade weir type design for intimate contact of the solvent and feed. The use of a continuous coalescence means across the entire diameter of the vessel and at each stage of the extraction zone may be excessive and may lead to premature shut-down of the extraction zone due to fouling of the coalescense means which would hamper fluid flow through the vessel.

U.S. Pat. No. 2,520,391 discloses a liquid-liquid contacting device in which baffles are disposed perpendicular to the trays to prevent vigorous agitation of the liquid. This patent utilizes modified bubble caps for contacting. A gas is introduced into the system or produced in situ by boiling to facilitate intimate liquid-liquid contacting. This design is not advantageous because of the necessity of introducing or producing a gas in the extraction zone. Also the high agitation produced by the gas is not suitable for a low interfacial tension system.

U.S. Pat. No. 2,669,505 describes a tower comprising contacting plates for a liquid-liquid extraction tower in which both the solvent and feed pass through perforate plates countercurrently and then flow cocurrently to the next stage. This design is not preferred because there is no means to regulate the number of orifices in the perforate plate to the varying flow rates encountered in a lube oil extraction zone.

European Patent Publication No. 20,094 describes an extraction process in which coalescing surfaces are disposed in the flow path of the extract phase prior to its exit from the extraction zone. This patent publication does not disclose an arrangement of coalescing surfaces which would permit the extract phase to contact the coalescing surfaces when clean and to by-pass the coalescing surfaces when they become fouled.

Accordingly, it is desired to provide a countercurrent cascade weir type extraction zone which is flexible and operable without instability or flooding at higher through-put rates than the conventional cascade weir extraction zones noted above.

It also is desirable to provide an extraction zone design which is readily adaptable to existing facilities, which have low capacity internals.

It is also desirable to provide an improved countercurrent, extraction zone design which is not prone to plugging and does not require the addition of any extraneous fluids to promote mixing of the solvent and feed.

The present invention is directed at an improved countercurrent, cross-flow cascade weir type extraction zone particularly useful for liquid-liquid systems which form relatively stable emulsions. The present invention comprises a perforate cascade weir means elevated with respect to its associated tray and a controlled riser means for conveying the phase to be dispersed to the cascade weir means. The weir means typically may be elevated from about 5% to about 50% of the tray spacing in the extraction zone above its associated tray. Calming baffles, and/or coalescence means also may be added for improved performance.

SUMMARY OF THE INVENTION

An extraction zone for the separation of a feed having a first component and a second component by contacting the feed with a solvent having a density differing from that of the feed, to thereby form a relatively light phase and a relatively heavy phase, said extraction zone of the type comprising:

A. a tower having vertically spaced-apart feed and solvent inlets and vertically spaced-apart light phase and heavy phase outlets;

B. a plurality of vertically spaced apart trays disposed in said tower;

C. riser means associated with at least one of said trays adapted to maintain a liquid level beneath said tray and adapted to provide a flow path for the light phase from below said tray to above said tray;

D. downcomer means associated with at least one of said trays adapted to provide a flow path for the relatively heavy phase from above said tray to below said tray; and E. cascade weir means comprising a perforate plate disposed above the surface of the tray with which said weir means is associated, whereby at least a portion of the relatively light phase passes through said perforate plate of said cascade weir means during its upward flow through said tower to disperse the relatively light phase into a plurality of droplets which pass upwardly and coalesce, the light phase and heavy phases subsequently exiting the extraction zone through the respective outlets. In a preferred embodiment a plurality, preferably a majority, of the cascade weir means are disposed above the associated trays. The perforate plates of the cascade weir means preferably are disposed substantially horizontally at a height of between about 5% and about 50%, preferably between about 5% and about 35%, of the tray spacing in the tower. Cross flow preferably is provided in the extraction zone by disposing vertically adjacent downcomer means in horizontally spaced apart relationship and by disposing vertically adjacent riser means in horizontally spaced apart relationship.

DETAILED DESCRIPTION OF THE INVENTION

Figure 1:
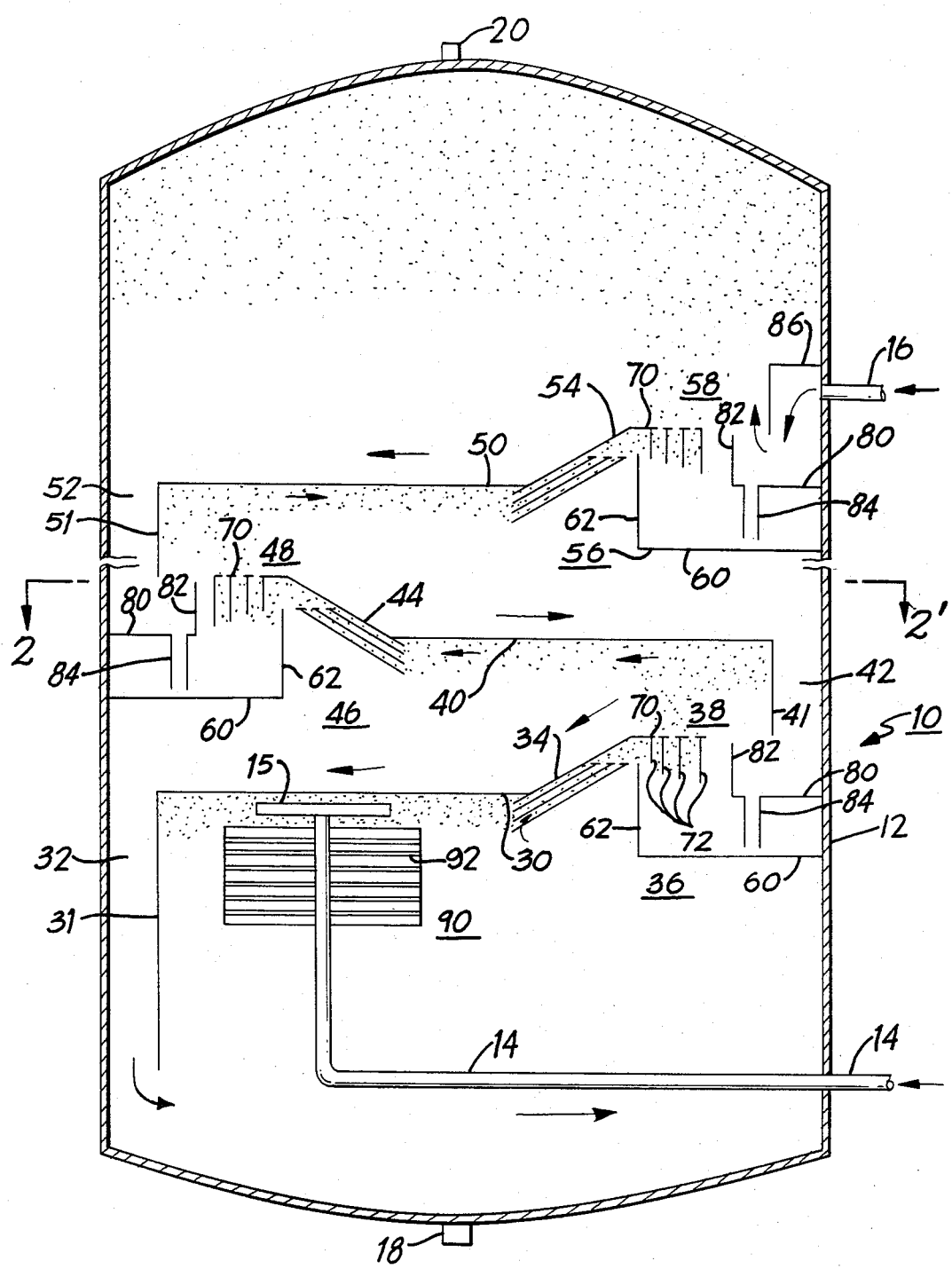
FIG. 1 is a simplified sectional view of an extraction zone utilizing the present invention.
Figure 2:
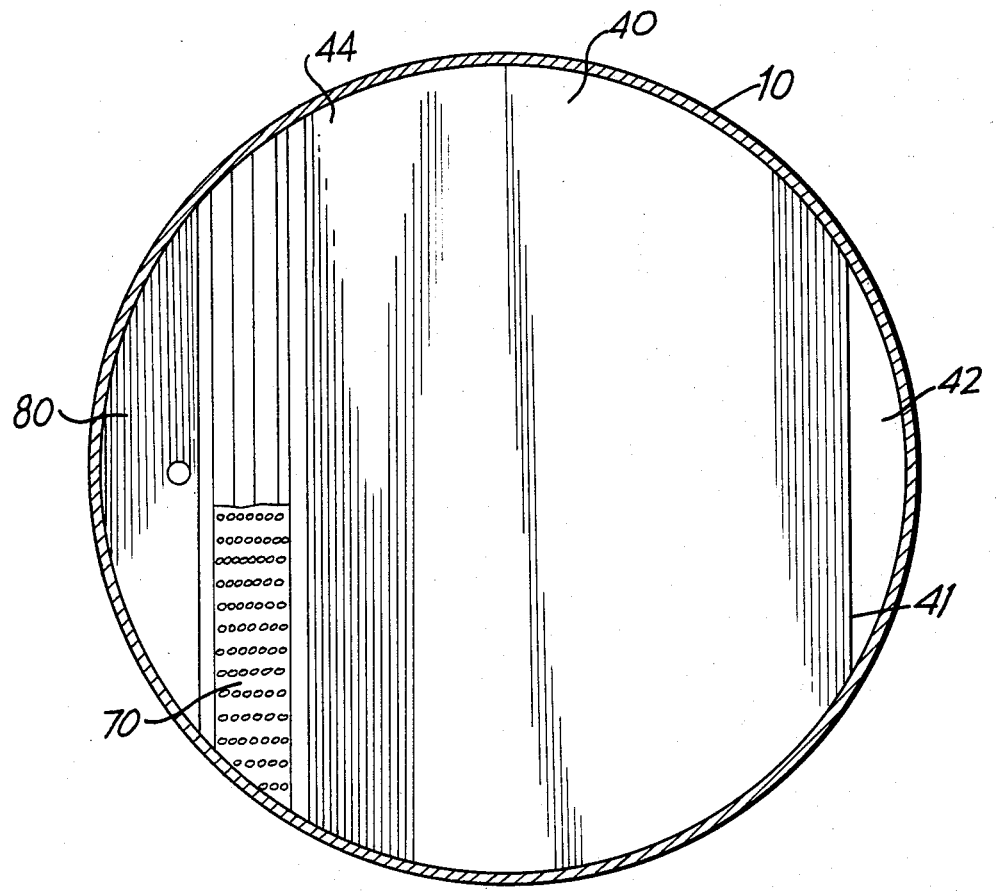
FIG. 2 is a plan view taken along section 2—2' of FIG. 1.

Referring to FIGS. 1 and 2, simplified elevational and sectional drawings are shown of an extraction zone incorporating the present invention. Extraction zone 10, is shown comprising a tower 12, having a feed inlet 14, solvent inlet 16, extract outlet 18 and raffinate outlet 20. Feed inlet 14 is shown extending into tower 10 and terminating at diffuser means 15. In this description it is assumed that the solvent is of a higher specific gravity than the feed. Where the solvent is less dense than the feed, the locations of the inlets 14 and 16 would be reversed as would the locations of outlets 18 and 20. Tower 12 is shown having three vertically spaced apart tray means, such as trays 30, 40 and 50, which preferably are substantially horizontally disposed. Affixed to the outer periphery of trays 30, 40, 50, are vertical extending sections, 31, 41, 51, respectively, which cooperate with the inner surface of tower 12 to define downcomer means 32, 42, 52 for directing the flow of solvent from each tray to a location beneath that tray. Also associated with each tray 30, 40 and 50 are riser means 34, 44 and 54, respectively, which operate to direct the light phase from each tray to an elevation higher than that respective tray.

As shown in FIG. 1, riser means 34, 44, 54 each preferably comprises a series of substantially parallel inclined fluid conduits having inlets at varying distances below the associated tray to thereby maintain a liquid level beneath the associated tray which facilitates coalescence of the light phase. While a liquid level also could be maintained beneath each tray by having the first vertically extending section 72 in seal means 36, 46, 56 terminate below the level of the associated tray, such a design would necessarily increase the length of at least one vertically extending section 72. Increasing the length of section 72 would increase the flow path of the light phase liquid and impart undesired energy to the light phase being dispersed by perforate plate 70. This also would permit undesired intermixing between the light phase and heavy phase in seal means 36, 46, 56. The riser means preferably are disposed at an angle of from about 25 to about 50 degrees from the horizontal. The outlet of each fluid conduit preferably comprises a restricted orifice which discharges directly into the light phase layer which builds up under the perforate means, thus avoiding premature dispersion and mixing with the heavy phase while permitting the dissipation of kinetic energy. Premature dispersion and mixing of the light phase with the heavy phase may lead to undesirable backmixing. To assure that the riser means discharges into the light phase, the outlet of each conduit preferably is at an elevation at least slightly higher than the bottom of vertically extending sections 72. This design of the riser means is of particular utility in the present invention in permitting efficient operation of the extraction zone over a wide range of feed rates. At low light phase flow rates only the uppermost fluid conduit of each riser means is utilized. As the flow rates increase, the light phase level near the riser means drops to a lower point where one or more additional fluid conduits are utilized to gently convey the light phase to the weir means. The restrictive orifices preferably associated with each fluid conduit are to maintain the flow rate through each fluid conduit below a predetermined level to thereby minimize entrainment of the heavy phase in the upwardly flowing light phase. They are of particular utility where the fluids processed have a relatively low interfacial tension. The restrictive orifices also operate to keep the fluid conduits which are in use, essentially full of the light phase fluid. In these orifices were not present, the light phase fluid would tend to flow up only the undersides of the uppermost fluid conduits at very high velocity. This is not desired, since the light phase would tend to break up into droplets and remix with the heavy phase as it flows up the riser means. This would cause the heavy phase to backmix in the fluid conduits and in the cascade weir means. This backmixing lowers the extraction zone efficiency and tends to hydraulically overload the trays. If restrictive orifices are utilized in the fluid conduits the light phase will exit the conduits directly into the light phase layer under perforate plate 70 relatively free of the heavy phase. Also associated with each tray 30, 40, 50 are seal means 36, 46, 56, respectively. In the instant design, seal means 36, 46, 56 each comprises a substantially horizontally extending seal pan 60 communicating with a substantially perpendicular segment 62 to define a volume above and in which is disposed cascade weir means 38, 48, 58, associated with trays 30, 40, 50, respectively. Each cascade weir means, such as cascade weir means 38, has a series of substantially horizontally disposed vertically depending sections, such as sections 72, depending from perforate means, such as perforate plate 70 having a plurality of orifices. The vertically depending sections are disposed spaced apart in the flow path of the light phase, the depth of the sections preferably increasing slightly with increasing distance from perpendicular segment 62. Seal means 36, 46 and 56 are shown having a baffle means 80, generally vertical sections 82 and drain pipe means 84. Baffle means 86, disposed in close proximity to inlet 16 directs the entering solvent downwardly. Coalescing means 90, having a plurality of coalescing screens 92, facilitates the final separation of the light phase from the heavy phase.

In the following description of the operation of the present invention, it will be assumed that the feed, such as a crude oil vacuum tower sidestream, is of a lower specific gravity than the solvent, such as phenol or N-methyl pyrrolidone. In this configuration the continuous phase in extraction zone 10 is the heavy, solvent phase. The main interface between the oil and solvent phases is above top tray 50, and, preferably, somewhat above solvent inlet 16, where it may be maintained by regulating the solvent inlet rate and/or regulating the solvent outlet rate. The feed enters tower 12 through line 14 and diffuser means 15 to form a light phase layer, indicated by the small dots, beneath tray 30. The light phase or less dense liquid travels in the direction shown by the shorter arrows, passing through one or more of the channels of riser means 34, over support 62 into seal means 36. The light phase then passes under one or more vertically extending sections 72, and thence upwardly through the relatively small perforations in plate 70 of weir means 38. In passing through perforate plate 70, which, preferably is substantially horizontally disposed, the light phase is broken up into tiny droplets which rise through the heavy phase and coalesce into another light phase layer beneath tray 40. The light phase then travels across the tray in the direction shown by the shorter arrows after which it passes through cascade weir means 48. This process of droplet formation and coalescence is repeated at each tray in the column until the light phase exits through outlet 20. Simultaneous with the upward passage of the light phase through tower 10, a heavy phase largely comprising the denser liquid entering through inlet 16 passes downwardly around baffle 86, as shown by the longer arrows, contacting the light phase droplets rising from perforate plate 70 of weir means 58. This heavy phase passes to the left above tray 50, and flows downwardly through downcomer means 52. After passing through downcomer means 52, the heavy phase contacts droplets rising from perforate plate 70 of weir means 48. The heavy phase then travels to the right above tray 40 afterwhich it passes through downcomer means 42. This downward cross flow of the heavy phase is repeated at each stage in tower 12. At each stage the solvent contacts the rising droplets for effective mass transfer. A build-up of uncoalesced light phase droplets, which may be entrained in the heavy phase passing through the downcomer at high flow rates, under the lowermost tray in the tower, such as tray 30, leaving the tower is reduced by the use of coalescer means 90 beneath the lowermost tray, which promotes coalescence due to the added surface area and oil wettability characteristics. Coalescer means 90 preferably comprises a series of screens 92, preferably wetted at least in part by the dispersed phase, which are disposed in tower 12 below diffuser means 15.

Figure 3:
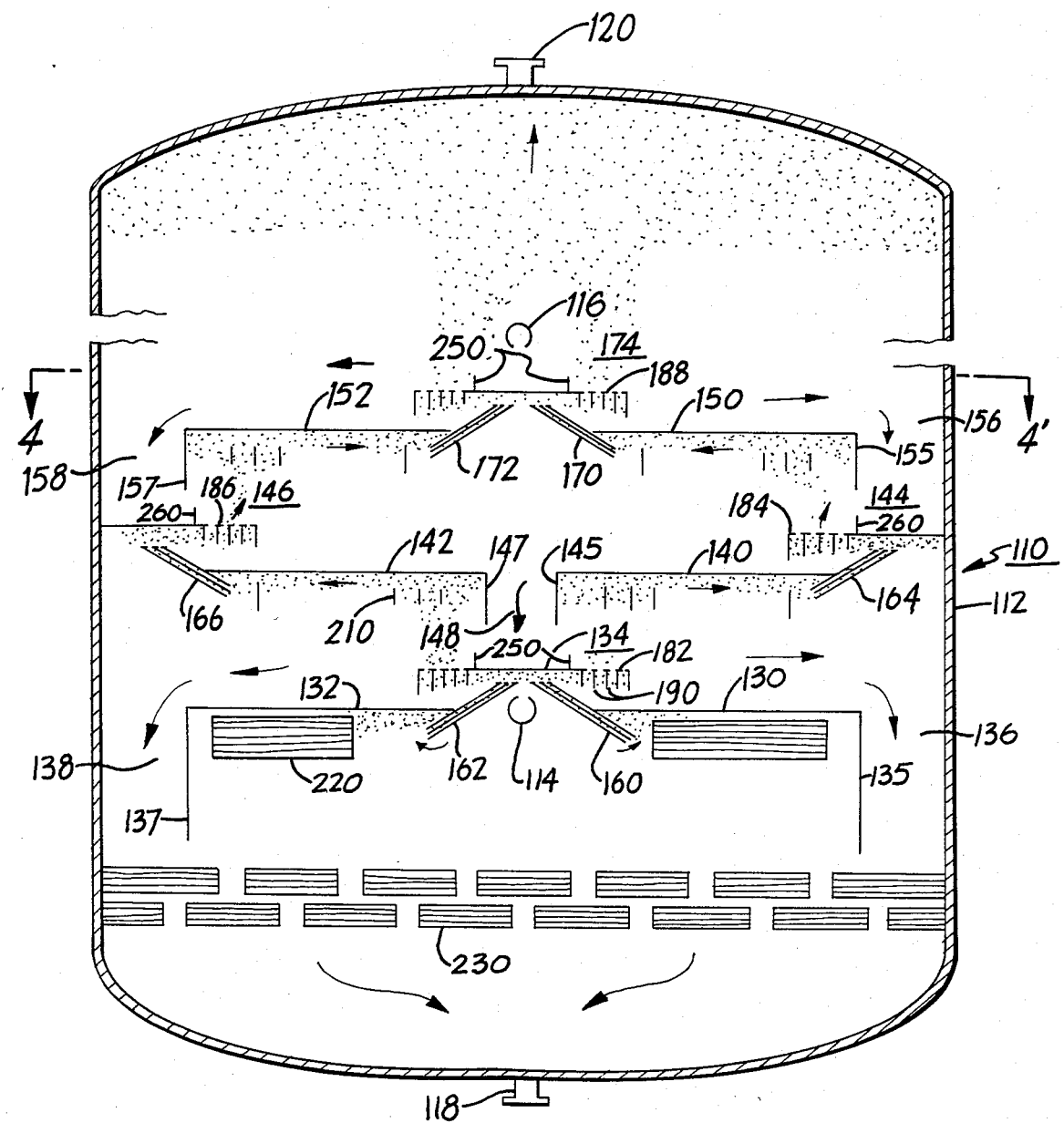
FIG. 3 is a simplified sectional view of a double pass extraction zone employing the present invention.
Figure 4:
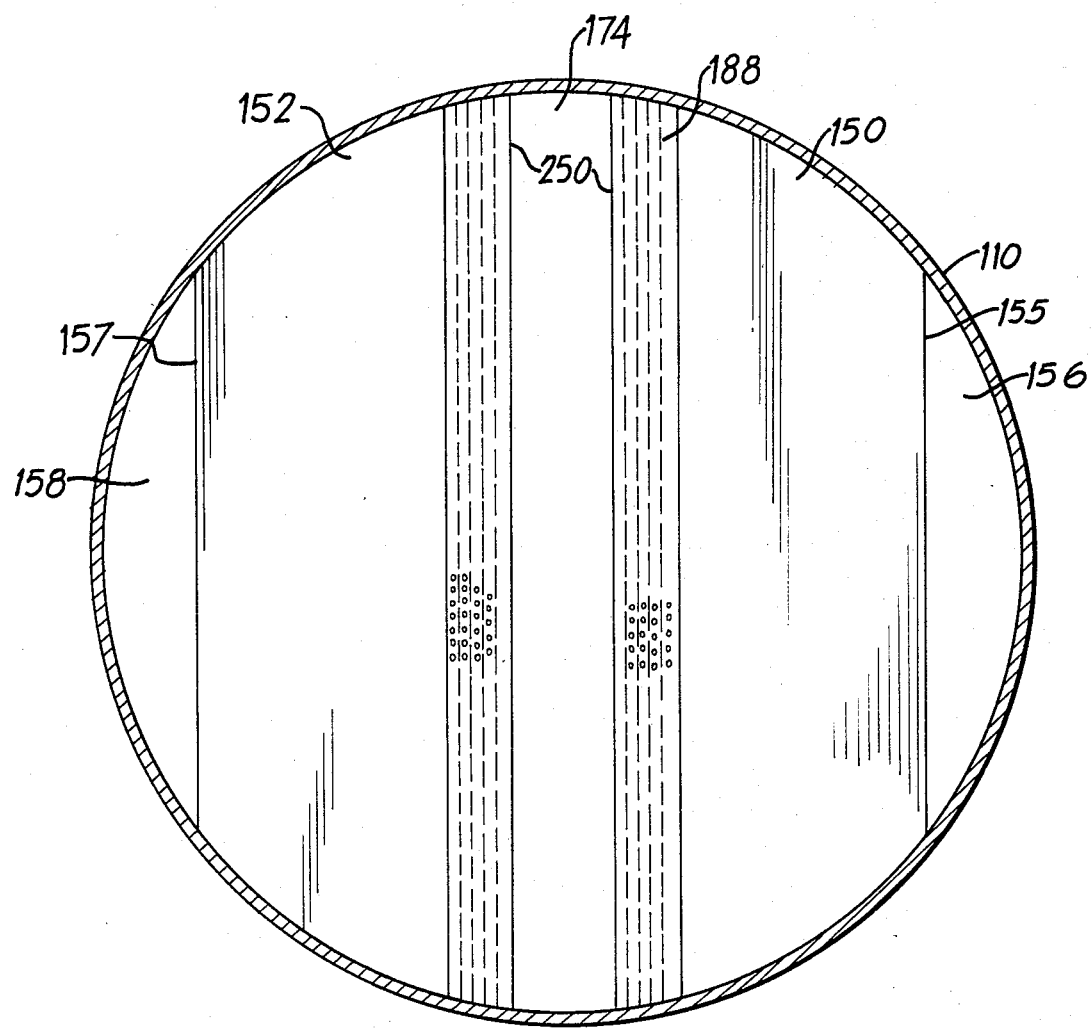
FIG. 4 is a plan view taken along section 4—4' of FIG. 3.

Referring to FIGS. 3 and 4 partial elevational and partial sectional views of a double pass countercurrent flow extraction zone 110 are shown. In this embodiment it again will be assumed that the solvent is more dense than the feed. In this embodiment again the light phase is indicated by the small dots and the flow path of the light phase is indicated by the relatively short arrows, while the flow path of the heavy phase is indicated by the longer arrows. In this embodiment, tower 112 is shown having a feed inlet 114, solvent inlet 116, extract outlet 118 and raffinate outlet 120. Tower 112 has a series of horizontally disposed, spaced apart trays. Each tray comprises a pair of tray halves, such as tray halves or segments 130 and 132; 140 and 142; 150 and 152. Inclined riser means, such as 160, 162, associated with tray segments 130, 132, respectively direct the light phase from beneath each respective tray segment to a common cascade weir means, such as weir means 134. Riser means, 160, 162, preferably comprise a series of parallel conduits having fluid inlets at varying distances below the associated tray to thereby maintain a liquid level beneath the associated tray which facilitates coalescence of the light phase as previously described. Restrictive orifices in the outlets of the fluid conduits maintain the fluid flow rate through each conduit below a predetermined limit as previously indicated for the embodiment of FIGS. 1 and 2. Common cascade weir means 134 preferably comprises a substantially horizontally disposed perforate plate 182. Beneath each weir means, such as weir means 134, are a series of vertical segments or sections 190 which preferably increase in depth with increasing distance from the center of tower 112 to regulate the flow of fluid through perforate plate 182 as previously described. Tray segments 140 and 142, disposed above cascade weir 134, redirect the upwardly flowing fluid stream outwardly. Even with the reduced distance between the perforate plate, such as perforate plate 182, and the next higher tray the kinetic energy of the droplets exiting from the perforate plate may cause turbulence and recirculation patterns above the perforate plate which adversely affects the settling and coalescence of the light phase beneath each tray and ultimately limits capacity and efficiency. Calming baffles, such as baffles 210, preferably are disposed beneath one or more trays to absorb the kinetic energy of the light phase rising from the weir means. Coalescing means, such as coalescing screens 220, optionally may be installed beneath one or more trays to facilitate coalescense of the light phase into a coherent layer. Riser means 164, 166, associated with tray segments 140, 142, respectively, direct the light phase from beneath the tray segments to outwardly disposed cascade weir means 144, 146, respectively. Weir means 144, 146 comprise perforate plates 184, 186, respectively, and a series of vertical extending sections 190, with the depth of the vertical sections preferably increasing gradually with increasing proximity to the center of tower 112. Fluid passing upwardly through perforate plates 184, 186, is redirected by tray segments 150, 152, respectively. The light phase from trays 150, 152 passes through riser means 170, 172, respectively, to common cascade weir means 174.

Simultaneously, the more dense liquid enters tower 112 through solvent inlet 116 and passes over common weir means 174 and thence onto tray segments 150, 152. To redirect the heavy phase across the trays, the vertically adjacent trays preferably have the downcomer means non-aligned relative to the downcomer means for each vertically adjacent tray. Where one tray preferably has the downcomer means disposed at the outer perimeter of the tray, the vertically adjacent tray preferably will have the downcomer means disposed at the center of the tower. In the embodiment shown in FIGS. 3 and 4 vertically extending sections 135, 137, 155, 157 of tray segments 130, 132, 150, 152, respectively, each cooperate with the inner surface of tower 112 to define downcomer means 136, 138, 156, 158, respectively. Similarly, vertically extending sections 145, 147, associated with tray segments 140, 142, respectively, cooperate to define downcomer means 148. Deflector baffle means 250 preferably are disposed on the upper surface of common cascade weir means 134, 174 to minimize direct impingement of the downflowing heavy phase on lube oil droplets being formed. Similarly deflector baffle means 260 are disposed on the upper surface of cascade weir means 144, 146. Coalescing means, such as coalescing screens 230 may be installed near the base of tower 112 to facilitate coalescence and separation of light phase droplets as hereinbefore indicated before the heavier phase exits from the tower. Screens 230 preferably are disposed in a checkerboard type arrangement to permit the downwardly flowing heavy phase to flow through the coalescence screens when the screens are relatively clean, but also to readily by-pass screens 230 if the screens become fouled with extraneous solids such as dirt, scale and corrosion by-products.

Operation of the above described double-pass coutercurrent flow cascade weir type extraction zone is described as follows for a system where the less dense feed is a lube oil feed and the more dense material added is a solvent, such as phenol or NMP. In this embodiment the solvent phase again is maintained as the continuous phase. The principal interface between the oil and solvent phases is maintained above top tray 150 and preferably above solvent inlet 116 by regulation of the solvent inlet and/or outlet rates. Lube oil enters tower 112 through oil inlet distributor 114 and passes upwardly into cascade weir means 134. The light, primarily lube oil phase, flows in both directions beneath vertical sections 190 and passes upwardly through perforate plate 182. If the level in cascade weir 134 deepens as the feed rate is increased, lube oil will flow beneath additional vertical sections 190, before passing through perforate plate 182. The lube oil level under cascade weir 134 determines the degree to which perforate plate 182 is utilized for transforming the lube oil layer into tiny droplets. Lube oil droplets exiting from perforate plate 182 are contacted by downflowing heavy phase, primarily comprising solvent, which has passed through downcomer means 148 to effect mass transfer of some lube oil impurities, such as aromatics, from the lube oil phase to the solvent phase. The lube oil droplets pass upwardly where they coalesce into a lube oil phase beneath tray segments 140 and 142. Baffles 210, operate to decrease the kinetic energy of the lube oil phase thereby decreasing turbulence which otherwise would retard separation and coalescence of the lube oil droplets and the solvent phase. The lube oil flows outwardly under tray segments 140, 142, and is transported to cascade weir means 144, 146, respectively, by riser means 164, 166, respectively. The design of riser means 164, 166 is such that only the uppermost fluid conduits of the riser means are used at low lube oil flow rates. As the flow rates increase, the lube oil level near the riser means drops to a lower point where one or more additional fluid conduits in each riser means are utilized to convey lube oil to cascade weir means 134. The incorporation of restrictive orifices into the fluid conduits maintains the flow rate through each conduit below a predetermined level. The lube oil passes through perforate plates 184, 186, to disperse and then recoalesce beneath tray segments 150, 152, respectively. The lube oil is directed upwardly to common cascade weir means 174 having perforate plate 188 by riser means 170, 172 associated with tray segments 150, 152, respectively. This process is repeated at each stage in extraction zone 110 until the lube oil exits tower 112 through raffinate outlet 120. Solvent enters tower 112 near the top through inlet 116 and flows downwardly extracting soluble impurities from the lube oil as previously described. Downwardly flowing solvent then flows horizontally over deflector baffle means 250 and across perforate plate 188 of cascade weir means 174 where it contacts droplets passing through the perforate plate. Deflector baffle means 250 prevents direct impingement of the solvent on the lube oil droplets being formed. This permits the formation of lube oil droplets of a sufficently large size with a minimum of exceptionally small droplets, which are not desired, since the smaller droplets tend to rise more slowly out of the solvent and would be likely to be entrained with downwardly flowing solvent. The solvent then passes above tray segments 150, 152, and passes through downcomer means 156, 158, respectively, afterwhich it contacts droplets rising from cascade weir means 144, 146, respectively, to effect mass transfer of a portion of the impurities from the lube oil fraction to the solvent. The solvent then passes downwardly above tray segments 140 and 142 afterwhich it passes through downcomer means 148. The solvent then removes additional soluble impurities from the lube oil fraction passing upwardly from perforate plate 182, of weir means 134. The solvent then passes above tray segments 130, 132, through downcomer means 136, 138, respectively, after which the solvent passes through coalescing screens 230 and outlet 118. Minor amounts of lube oil entrained in the solvent may separate from the exiting solvent as the solvent passes through coalescing screens 230. This lube oil rises in the form of droplets and accumulates beneath tray segments 130, 132 after which it passes through riser means 160, 162 for further contacting along with the feed entering through inlet 114.

While the extraction zones described above are single pass or double pass towers, it is clear that the aforementioned technology is equally applicable to towers having more than two passes. While the single pass and double pass extraction towers shown herein each comprised three trays for simplicity, commercial extraction towers typically will comprise from about 10 to about 30 trays.

In the single or multiple pass tower described above, the perforate plate of at least one of the weir means is disposed above its associated tray between a height of about 5% and about 50% of the tray spacing in the tower, preferably at a height of between about 5% and about 35% of the tray spacing in the tower.

The following example, in which the cascade weir means are located above the associated trays, permits an increase in the lube oil through-put as compared with a conventional coutercurrent, cross-flow extraction zone in which the cascade weir means is located at substantially the same level as the tray.

A rectangular laboratory extraction zone having a 9.5 feet by 7 inch base and a height of 12.5 feet with 3 trays of the same general configuration as shown in FIG. 1 on a 30 inch tray spacing was utilized with a lube oil feed rate of 80 barrels per day per square foot of extraction zone area. However, the extraction zone did not have riser means adapted to maintain a liquid level beneath the associated tray. The solvent feed rate was 400% of the lube oil feed rate. The lube oil feed, a low viscosity naphthenic industrial lubricating oil, and NMP solvent were added to the extraction zone countercurrently at a temperature of approximately 30° C. to simulate commercial operating conditions. Table I below indicates the wt% oil emulsion in the solvent phase at a location two feet below the bottom tray.

TABLE I

EFFECT OF PERFORATE PLATE HEIGHT ON EXTRACTION ZONE PERFORMANCE

| Height of Perforate Plate Above Associated Tray | | wt % Oil Emulsion in Solvent |
|---|---|---|
| % of Tray Spacing | Inches | |
| 0 | 0 | 5 |
| 5 | 1.5 | 2 |
| 10 | 3 | 1 |

Typically, 5 wt% oil emulsion in the solvent at a location two feet below the bottom tray of the extraction zone is an indication of incipient flooding i.e., unacceptable entrainment of lube oil in the solvent leaving the extraction zone is beginning to occur. Thus, it may be seen that elevating perforate plate 70 substantially decreased the wt% oil emulsion in the extraction zone preventing incipient flooding. This would permit an increase in through-put, a reduction in oil emulsion in the exiting solvent, or a combination of both.

The following example illustrates the applicability of the instant invention to a double pass countercurrent flow extraction zone and the superiority of a double pass extraction zone illustrating the instant invention as compared to a conventional single pass extraction zone not employing the instant invention. In this example the liquids used were the same as those of the previous example. The extraction zone temperature again was maintained at approximately 30° C. The liquid flow rates were 120 barrels of oil per day per square foot of tower cross-sectioned area and a 265 vol.% solvent treat. The double pass extraction was performed in the previously described laboratory extraction tower with 3 double pass trays on a 30 inch tray spacing. The perforate plates were approximately 9 inches or 30% of the tray spacing above the associated trays with calming baffles under one tray. The double pass extraction zone utilized riser means 160, 162, 164, 166, 170, 172 as shown in FIG. 3. Each riser means comprised two fluid conduits approximately 1 inch wide, 7 inches deep, and 14 inches in length, each fluid conduit having a ¾ inch diameter restrictive orifice. The opening of the first fluid conduit in each riser means extended approximately one inch below the associated tray, while the opening of the second fluid conduit of each riser means extended approximately four inches below the associated tray to thereby maintain the liquid level beneath the associated tray between about one and about 4 inches. The conventional single pass column used for comparison was that previously described. The wt% oil emulsion in the solvent phase was measured at the same location as in the previous example. The results are tabulated below in Table II.

TABLE II
COMPARISON OF IMPROVED DOUBLE PASS EXTRACTION ZONE PERFORMANCE WITH CONVENTIONAL SINGLE ZONE PERFORMANCE

| Tray Configuration | wt % Oil Emulsion in Solvent Phase |
|---|---|
| Single Pass Cascade Weir at Tray Level | 56 |
| Double Pass-Perforated Plate Elevated 9 inches above associated tray | 2 |

The single pass tray is well into the flooded condition, while the improved double pass extraction zone is significantly below the point of incipient flooding. This improved performance for the double pass tray is attributable to the presence of the riser means, to the elevated cascade weir means, and to the double pass arrangement, which reduces the solvent velocity by 50%, thereby reducing turbulence and improving lube oil phase settling. Thus, it can be seen that for both the single pass and double pass designs elevating the weir means above the associated try provides a significant improvement in operating performance.

Existing extraction zones in which the perforate plate of the cascade weir means is at substantially the same level as the associated tray may be retrofitted to utilize cascade weir means having elevated perforate plates. While the present invention has been shown with embodiments in which the cascade weir means has been elevated above its associated tray for every tray, it is possible to practice the instant invention and to realize some operational benefits by elevating the cascade weir means for only some of the trays. This may be especially attractive in retrofit situations. In such a situation, where only a portion of the cascade weir means are to be modified to raise the perforate plates above their associated trays, it is suggested that the lowermost trays in the tower, where the feed is introduced, be modified, since these trays are the most heavily loaded and will operate most effectively to reduce the entrainment of the lube oil in the solvent phase.

While the present invention has been shown to be effective for lube oil solvent systems, it is apparent that this invention is equally applicable to other extraction applications.

What is claimed is:

1. An extraction zone for the separation of a feed having a first component and a second component by contacting the feed with a solvent having a density differing from that of the feed to thereby form a relatively light phase and a relatively heavy phase, said extraction zone of the type comprising:
   A. a tower having vertically spaced-apart feed and solvent inlets and vertically spaced-apart light phase and heavy phase outlets;
   B. a plurality of vertically spaced-apart trays disposed in said tower;
   C. riser means associated with at least one of said trays adapted to provide a flow path for the light phase from below said tray to above said tray, said riser means comprising a plurality of fluid conduits having restricted outlet orifices to convey the light phase without substantial dispersion of the light phase into droplets; and
   D. downcomer means associated with at least one of said trays adapted to provide a flow path for the relatively heavy phase from above said tray to below said tray, whereby the light phase passes upwardly through the heavy phase, the light phase and the heavy phase exiting the tower through said respective outlets.

2. The extraction zone of claim 1 further comprising a cascade weir means, the light phase passing from the riser means through said cascade means.

3. An extraction zone for the separation of a feed having a first component and a second component by contacting the feed with a solvent having a density differing from that of the feed to thereby form a relatively light phase and a relatively heavy phase, said extraction zone of the type comprising:
   A. a tower having vertically spaced apart feed and solvent inlets and vertically spaced apart light phase and heavy phase outlets;
   B. a plurality of vertically spaced apart trays disposed in said tower;
   C. riser means comprising a plurality of inclined fluid conduit wherein at least one of said conduits having a restricted outlet orifice therein to regulate flow through said fluid conduit associated with at least one of said trays adapted to maintain a liquid level beneath said tray and adapted to provide a flow path for the light phase from below said tray to above said tray;
   D. downcomer means associated with at least one of said trays adapted to provide a flow path for the heavy phase from above said tray to below said tray; and
   E. cascade weir means comprising a perforate plate disposed above the surface of the associated tray, whereby light phase passes through said riser means and said perforate plate of said cascade weir means during its upward flow through said tower to disperse the light phase into a plurality of droplets which pass upwardly through the heavy phase and coalesce, the light phase and heavy phase subsequently exiting the tower through the respective outlet.

4. The extraction zone of claim 1 wherein said fluid conduits have fluid inlets disposed beneath the level of the associated tray to regulate the liquid level beneath the associated tray.

5. The extraction zone of claim 1 wherein said perforate plate is disposed at a height of at least 5% of the tray spacing in said tower above the associated tray.

6. The extraction zone of claim 5 wherein said perforate plate is disposed at a height of at least 10% of the tray spacing in said tower zone above the associated tray.

7. The extraction zone of claim 1 wherein at least one perforate plate is disposed above its associated tray between a height of about 5% and about 50% of the tray spacing in said tower.

8. The extraction zone of claim 7 wherein the perforate plate of at least one of said weir means is disposed at a height between about 5% and about 35% of the average tray spacing in said extraction zone above its associated tray.

9. The extraction zone of claim 8 further comprising spaced-apart vertically depending sections from said perforate plate.

10. The extraction zone of claim 9 wherein the liquid level beneath said cascade weir means is regulated at least in part by the depth of at least one of said vertically depending sections.

11. The extraction zone of claim 10 wherein the liquid level beneath said tray associated with a cascade weir means is regulated by said fluid conduits.

12. The extraction zone of claim 11 wherein said plurality of fluid conduits are disposed in parallel relationship at differing elevations whereby the flow rate through each conduit is maintained below a predetermined limit.

13. The extraction zone of claim 12 wherein the extraction zone is a single-pass extraction zone.

14. The extraction zone of claim 12 wherein the extraction zone is a multiple-pass extraction zone.

15. The extraction zone of claim 12 comprising a plurality of downcomer means and wherein vertically adjacent downcomer means are disposed in horizontally spaced apart relationship, the heavy phase flowing across said tray in passing between vertically adjacent downcomer means.

16. The extraction zone of claim 15 comprising a plurality of riser means and wherein vertically adjacent riser means are disposed in horizontally spaced apart relationship, the light phase flowing below said tray in passing between vertically adjacent riser means.

17. An extraction zone for the extraction of an undesired component from a lube oil feed by contacting the lube oil with a solvent denser than the lube oil, said extraction zone of the type comprising:
A. a tower having vertically spaced apart feed and solvent inlets and vertically spaced apart lube oil and solvent outlets;
B. a plurality of vertically spaced apart trays in said tower;
C. riser means comprising a plurality of inclined fluid conduits wherein at least one of said conduits having a restricted outlet orifice therein to regulate flow through said fluid conduit associated with at least one of said trays adapted to maintain a liquid level beneath said tray and adapted to provide a flow path for the lube oil from below said tray to above said tray;
D. downcomer means associated with at least one of said trays adapted to provide a flow path for the solvent from above said tray to below said tray; and,
E. cascade weir means having a perforate plate disposed above the surface of the associated tray, whereby lube oil passes through said riser means and said perforate plate, said perforate plate dispersing the lube oil into a plurality of droplets which pass upwardly through the solvent from said downcomer means, the solvent extracting undesired component from the lube oil, the lube oil and solvent exiting said tower through the respective outlets.

18. The extraction zone of claim 17 wherein said inclined fluid conduits have fluid inlets disposed beneath the level of the associated tray to regulate the liquid level beneath the associated tray.

19. The extraction zone of claim 18 wherein said cascade weir means perforate plates are disposed above a plurality of associated trays.

20. The extraction zone of claim 19 wherein vertically adjacent downcomer means are disposed in horizontally spaced apart relationship, the solvent flowing across said trays in passing between vertically adjacent downcomer means.

21. The extraction zone of claim 20 wherein riser means for vertically adjacent trays are in horizontally spaced apart relationship, the lube oil flowing under said trays in passing between vertically inclined adjacent riser means.

22. The extraction zone of claim 21 further comprising calming baffles disposed beneath at least one of said trays to decrease the turbulence of the lube oil passing upwardly from said weir means.

23. The extraction zone of claim 21 further comprising coalescence screens disposed in said tower near the base in a checkerboard-type arrangement, to permit downwardly flowing solvent to pass through said coalescence screens when said screens are relatively clean and to by-pass said screens when said screens become fouled.

* * * * *